Sept. 11, 1956

J. L. ZITO 2,762,424

TIRE BEAD BREAKING DEVICE WITH CIRCUMFERENTIALLY
DISTRIBUTED THRUST MEMBERS

Filed July 22, 1954

INVENTOR
JOSEPH L. ZITO

BY Moses, Nolte, Cravo & Berry
ATTORNEYS

Sept. 11, 1956 J. L. ZITO 2,762,424
TIRE BEAD BREAKING DEVICE WITH CIRCUMFERENTIALLY
DISTRIBUTED THRUST MEMBERS
Filed July 22, 1954 3 Sheets-Sheet 2

INVENTOR
JOSEPH L. ZITO
BY *Marr, Notte, Lower & Berry*
ATTORNEYS

Sept. 11, 1956  J. L. ZITO  2,762,424
TIRE BEAD BREAKING DEVICE WITH CIRCUMFERENTIALLY
DISTRIBUTED THRUST MEMBERS
Filed July 22, 1954  3 Sheets-Sheet 3

INVENTOR
JOSEPH L. ZITO
BY
ATTORNEYS

United States Patent Office 2,762,424
Patented Sept. 11, 1956

2,762,424

TIRE BEAD BREAKING DEVICE WITH CIRCUMFERENTIALLY DISTRIBUTED THRUST MEMBERS

Joseph L. Zito, Amityville, N. Y., assignor to E. & G. Machine and Tool Company, Copiague, N. Y., a partnership Application July 22, 1954, Serial No. 445,051

2 Claims. (Cl. 157—1.28)

This invention relates to tire demounting equipment and more particularly to mechanism adapted for use in demounting airplane tires.

The present mechanism is of a kind in which both beads of a tire may be broken loose from the wheel or rim at a single operation, and purely by axial thrust. In machines of this kind it has been usual to provide opposed, flanged, tire engaging discs whose flanges engage the tire beads uniformly and with even pressure all around. The total pressure is thus evenly distributed, the tendency being to break the beads at all points simultaneously. This means that in order to break the bead at all a bead breaking pressure, or near breaking pressure, must be simultaneously applied all the way around the tire. According to this principle of operation the total pressure exerted must be great in order to break the bead at all. The difficulty is accentuated by the fact that pressure applied simultaneously but equally at all points tends to compress and compact the rubber, and thereby to increase the force with which the tire is bound against the wheel.

In accordance with the present invention the disc flanges are divided into segments with each segment flange formed of progressively varying height. As pressure is applied it is concentrated first at the highest points and is extended progressively toward the lowest points. This has the advantage that a high bead breaking pressure is built up at the highest points while the pressure applied at other points is comparatively small. A comparatively small total pressure is required to start the break. When the break has occurred at the highest points the resistance at those points substantially disappears and the next highest regions become the areas of maximum pressure. This effect continues progressively until the entire bead has been broken. Not only is the total pressure reduced because of the progressive character of the break, but the bead is put under circumferential tension, cramping effects being avoided by reason of the fact that the high points of the disc tend to displace the portions of the bead engaged by them away from the adjacent portions of the bead.

It is a feature that each disc rim includes several equally spaced high points. This has the advantage that notwithstanding the concentration of the breaking pressure at selected points the total pressure is balanced around the circumference of the wheel. It has the further advantage that the slope of the disc flanges may be sufficiently pronounced to apply the principle of progressive breaking effectively, without necessitating an objectionably large difference of height between the highest and lowest parts of the disc flange.

It is a further object to provide a machine of the kind referred to which is free from peripheral obstruction to the introduction of a combined wheel and tire unit and the removal of the wheel and tire after they have been forcibly disunited. To this end it is a feature that the machine is provided with a removable unit which is made to comprise a hydraulic jack, a guide frame slidably supporting the jack body and including a reaction bar above the jack for positively preventing upward displacement of the jack piston, and a central tension bar for connecting the machine base through the center of the wheel with said guide frame. Because the upper and lower units are connected through the center of the wheel, they may be of considerably less diameter than the tire. The limitation of dimensions reduces the cost, weight and bulk of the units, thereby enabling them to be manufactured more economically, to be transported more conveniently, and to be wheeled about as a combined structure more easily.

It is a still further object of the invention to provide means for preventing springing outward of the beads toward the wheel flanges where they might become frictionally bound on the wheel, upon the relief of pressure against the beads by the discs. To this end the disc flanges are formed with abrupt, deep notches and headed tools are provided whose heads may be inserted through the respective notches and then caught in place after the beads have been broken and before the discs have been permitted to be separated by the elastic action of the tire.

Other objects and advantages will hereinafter appear.

In the drawing forming part of this specification,

Figure 1:
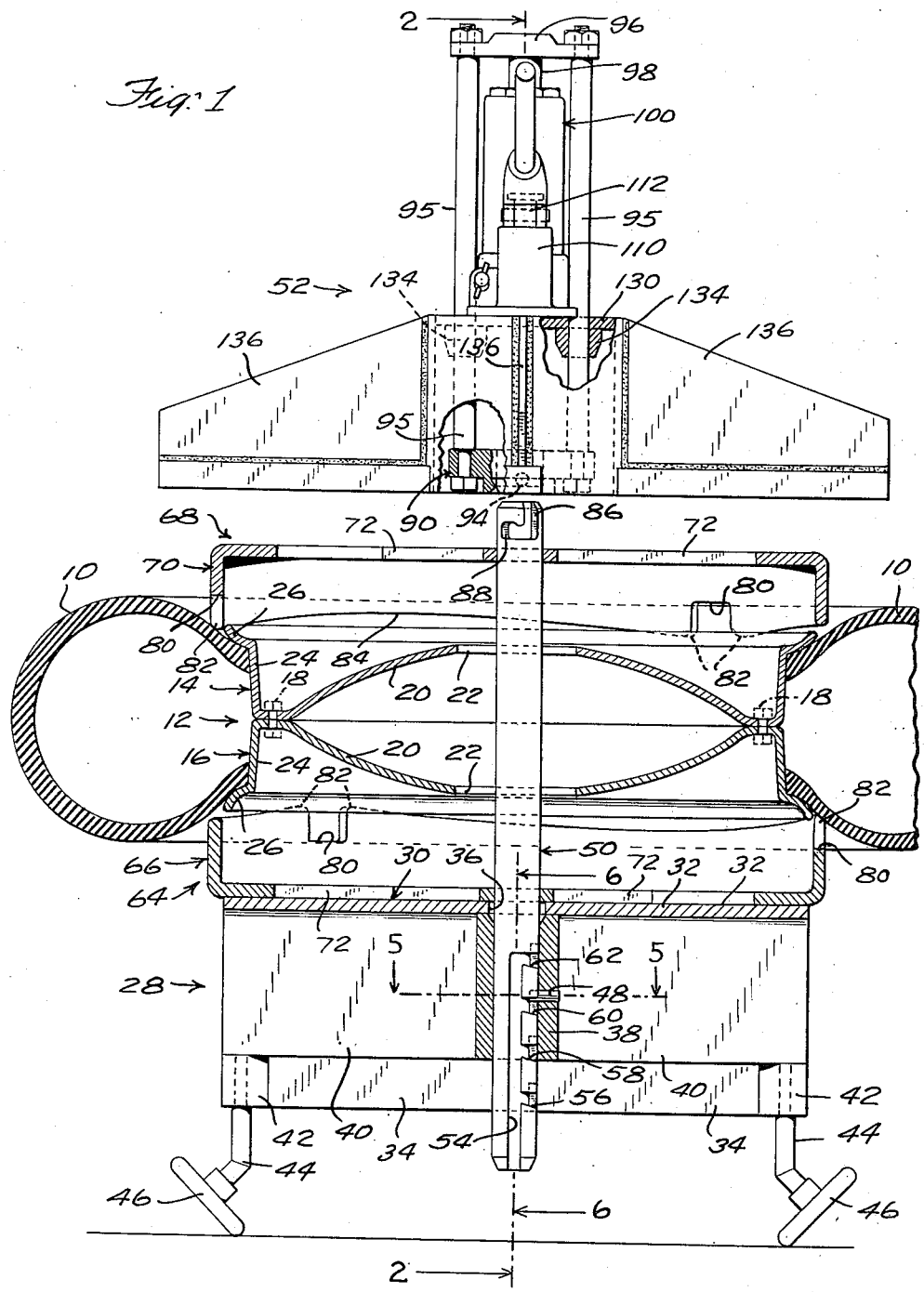
Figure 1 is a view in sectional elevation, partly broken away, of a machine embodying the present invention with a wheel applied to it, the jack unit being shown detached but just above the position which it will occupy when it is attached to the lower portion of the machine.
Figure 2:
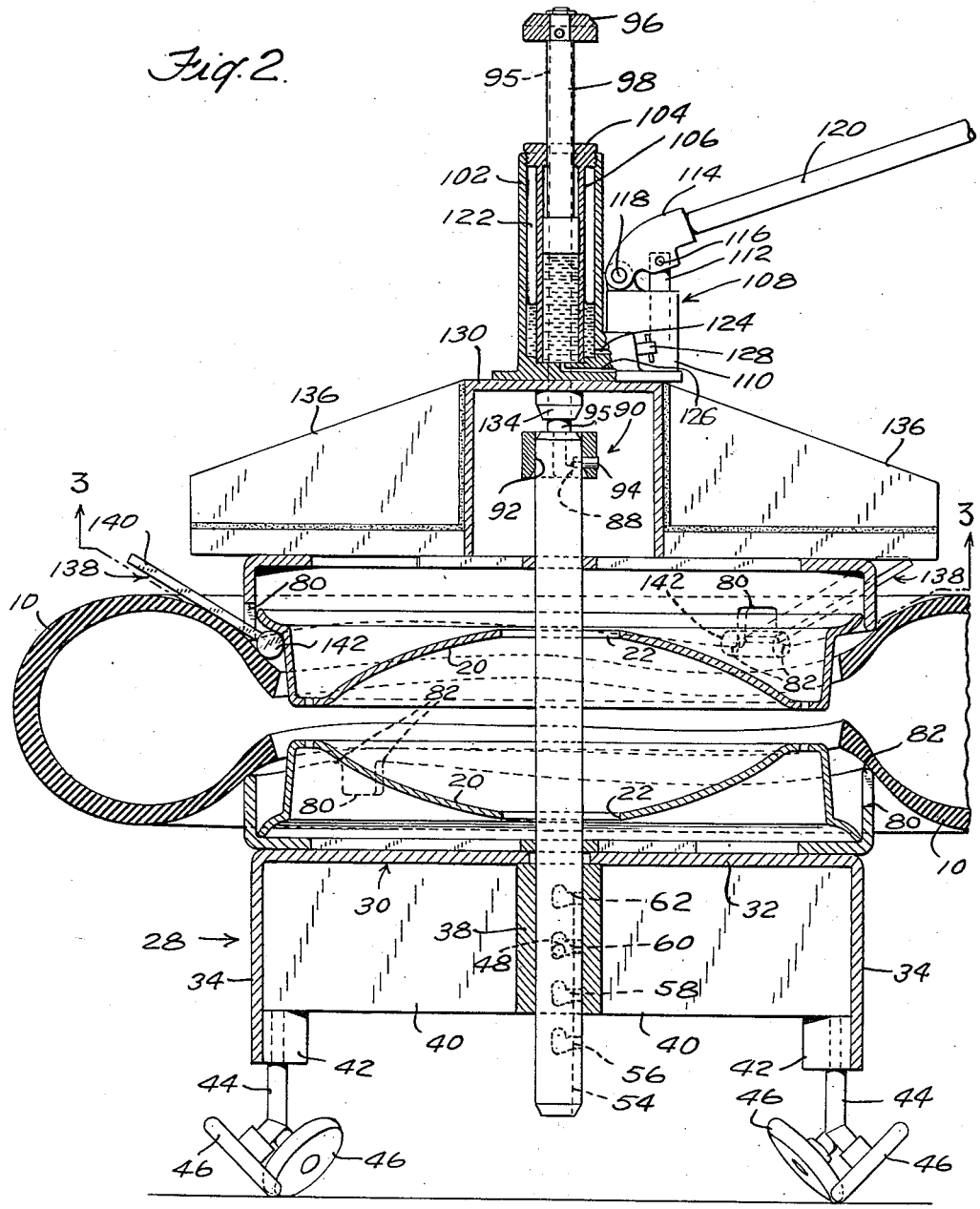
Figure 2 is a vertical sectional view, partly broken away, of the same machine and wheel, the section being taken on the line 2—2 of Figure 1, looking in the direction of the arrows, but both tire beads being shown broken and the upper one locked against re-expansion into contact with the wheel rim flange by inserted tools, the jack body being shown partly raised after the breaking operation.

In the drawing the machine is shown acting upon a tire 10 carried by a metal wheel 12, composed of complementary separable sections 14 and 16. The wheel is of a type well known in military aircraft, and since it is not part of the present invention some details have been omitted. The complementary sections 14 and 16 of a wheel 12 are normally held together by a series of bolt and nut combinations 18, of which one is shown in dotted lines in Figure 1. When a tire 10 is to be removed from a wheel 12 the bolt and nut combinations 18 are first removed so that the sections 14 and 16 may be freely separated from one another upon the breaking free of the tire beads from them. Each of the sections 14, 16 includes a bulged body part 20 having a central opening 22, a tapered rim 24, and a rim flange 26. The rims increase in diameter from the central plane in which the sections 14 and 16 meet, outward toward the flanges 26. Normally an inner tube would be present in the tire 10, but, since this structure is well known and forms no part of the invention, the inner tube, its valve stem, and the wheel construction for accommodating the valve stem have not been illustrated.

Figure 5:
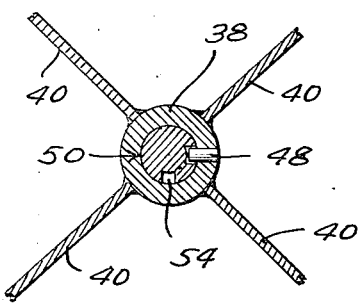
Figure 5 is a fragmentary sectional view taken upon the line 5—5 of Figure 1, looking in the direction of the arrows.
Figure 6:
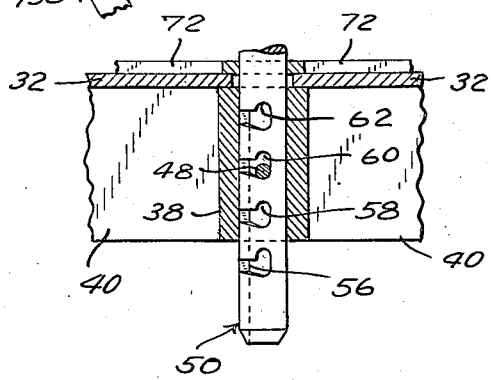
Figure 6 is a fragmentary sectional view taken upon the line 6—6 of Figure 1, looking in the direction of the arrows.

The machine comprises a base unit 28 which includes a sheet metal platform member 30. The member 30 includes a rectangular horizontal body part 32 and downturned end portions 34. The body part 32 is formed with a central opening 36 and has attached to its underside a sleeve 38 in axial alignment with said opening. Vertically disposed diagonally extending reinforcing webs 40 (Figure 5) are secured to the sleeve 38 and to corner portions of the member 30. Blocks 42 secured to the flanges 34 beneath the outer ends of the four reinforcing webs 40 provide vertical bearings for the vertical stems 44 of supporting rollers 46. A pin 48 extends radially inward through a wall of the sleeve 38, having a drive fit therewith. The pin is adapted for detachably connecting the base unit with a tie rod 50 which fits the bore of the sleeve 38.

The tie rod 50 is designed to connect the base unit 28 with an upper pressure applying or jack unit 52. The machine is desirably adapted to handle wheels of different diameters and thicknesses, the illustrative machine being designed for wheels of several different thicknesses. The rod 50 is adapted for connection to the base unit in any one of four selected positions. The lower end of the rod 50 is provided with a longitudinal slot 54 in one of its sides, the slot being of sufficient depth and width to pass the inwardly projecting end of the pin 48. Four bayonet type slots 56, 58, 60 and 62 branch off at successively higher levels from the slot 54, and the pin 48 is adapted to be selectively locked in any one of them. When the size of the wheel to be dealt with (generally identified by reference to the tire size) is known, the rod 50 is adjusted in position by lodging the pin 48 in the appropriate slot. With wheels of the type illustrated, there is generally an increase of thickness with increase of diameter. The diameters increase by steps, and the thicknesses increase by steps, but there is not necessarily a proportional increase of thickness for each increase of diameter.

A lower flanged disc 64 is next impaled upon the rod 50 and lowered to rest, flange side up, upon the platform member 30. The wheel 12 with the tire 10 upon it is next passed downward around the rod 50 to rest upon the flange 66 of the disc 64. Discs 64 are provided in four different sizes, a disc being chosen in each instance of just the proper size to fit around the lower rim flange 26 and support the wheel through engagement with the tire bead. Since the flange 66 fits the exterior of the rim flange 26 it serves accurately to center the wheel relative to the rod 50. For a reason which will be made apparent the maximum flange height for a given wheel and tire must be less than the initial spacing of the beads to be broken. Since the ratio of bead spacing to wheel diameter is generally not less than 15 to 100, the ratio of maximum flange height to disc diameter may run as high as 15 to 100, but will ordinarily be somewhat less than the latter ratio, ranging down to 10 to 100.

Figure 3:
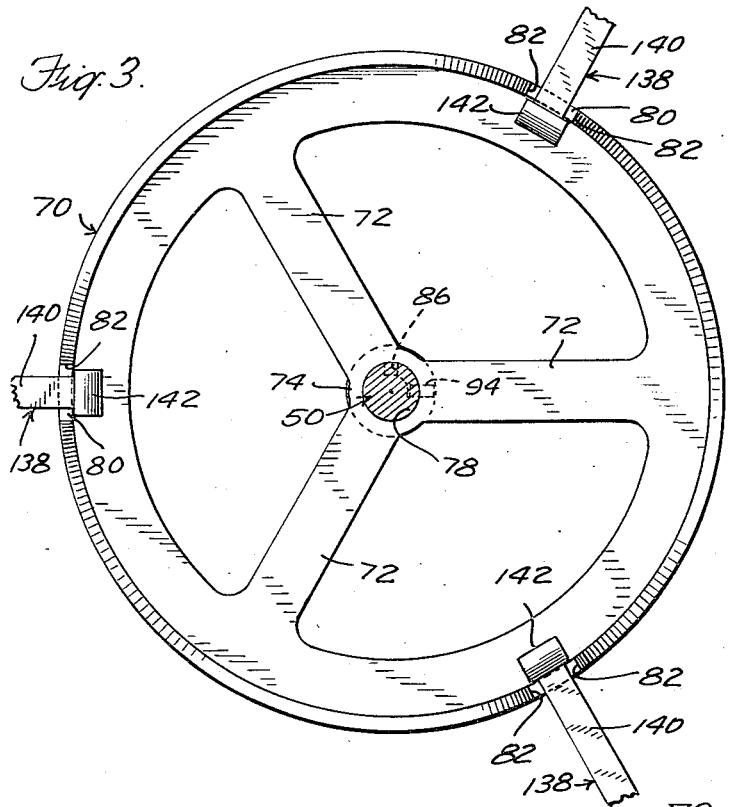
Figure 3 is a fragmentary sectional view taken upon the line 3—3 of Figure 2, looking in the direction of the arrows but with the wheel part omitted.
Figure 4:
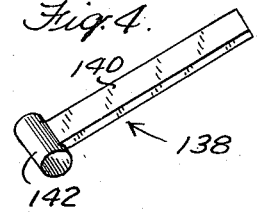
Figure 4 is a perspective view of one of the three identical tools shown in Figure 3.

An upper flanged disc 68, chosen of appropriate size from a group of discs of four different sizes, is next placed upon the wheel 12 with its flange 70 faced downward. The flange 70 fits around the upper rim flange 26 and bears against the upper side of the tire 10 adjacent said flange. The lower disc 64 and the mating upper disc 68 are duplicates of one another. The body of each disc 64 includes three radial spokes 72 (Figure 3) which are connected to a central or hub portion 74. The portion 74 is formed with a central circular opening 78 of a size to fit the central tie rod 50.

The flange portions 66 and 70 of mating discs 64 and 68 are identical. It is not important, however, that the mating discs be disposed in any particular angular arrangement to one another. Each is formed with three equiangularly spaced square notches 80 whose side walls connect through rounded shoulders with the exposed end faces of the flange. The purpose and use of the notches, apart from the advantage which they afford in the bead breaking operation, will be made clear at a subsequent point. The notches 80 divide the flange into three equal segments, each of which has high points 82 at its opposite ends adjacent the notches. The flange height diminishes progressively from each high point to a low region 84 intermediate the high points, and desirably midway between them. Although the six high points are not equally spaced from one another, it is apparent that they are distributed in a balanced manner, the three flange segments being of equal length and the three notches being of equal width. The notches contribute importantly to the initial breaking at the high points because the pressure abruptly diminishes from maximum to zero at the notched side of a high point.

When the tie rod has been adjusted relative to the base unit 28 and the discs 64 and 70 together with the wheel 12 have been assembled with the rod and base as described, the assembly is ready for the application of the pressure or jack unit 52. The upper end of the rod 50 is formed with a vertical slot 86 which communicates with a bayonet slot 88.

The upper unit 52 comprises a rectangular block 90 which is formed with a central circular recess 92 in its bottom face, the recess being designed to receive and fit upon the upper end of the rod 50. A pin 94 is passed inward through a wall of the block 90, having a driving fit therewith, and projects into the recess 92 for cooperation with the slots 86 and 88 of the rod 50. The block 90 has affixed to its opposite ends upstanding parallel guide rods 95. The upper ends of the rods 95 are rigidly secured to a stationary thrust or reaction block or bar 96, which block is affixed to the upper end of the piston rod 98 of a hydraulic jack 100.

The jack 100 may be of conventional construction. It is illustrated as comprising a body or casing member 102 which is closed at its upper end by a plug or cover member 104 from which a cylinder 106 extends downward into engagement with the base of the casing 102. As shown, an annular space is defined between the casing 102 and the cylinder 106 which serves as a reservoir for the hydraulic fluid.

A small liquid pump 108 is supported on an extension of the base of the casing 102, the body 110 of the pump defining a cylinder (not shown) in which a piston 112 is reciprocably mounted. The piston 112 is connected at its upper end to an operating lever 114 through a pivot pin 116. The lever 114 is pivotally mounted on the pump body 110 by a fulcrum pin 118. The lever 114 is of hollow construction, being adapted to have a long operating handle 120 removably inserted in it. The pump is adapted to draw hydraulic fluid from the reservoir 122 through a passage 124 and to deliver it into the lower end of the cylinder 106 through a passage 126. The passages 124 and 126 are desirably provided with appropriate check valves not shown. A manually rotatable needle valve 128 is adapted to be turned to open position when it is desired to permit the return of hydraulic fluid from the cylinder 106 to the reservoir 122 and to be turned to closed position for preventing such return flow at other times. The hydraulic jack 100 may be of conventional construction, neither the jack itself nor any of its details being novel per se.

The base of the jack body 102 overlies, and is connected to, an inverted cup-like member 130. The member 130 is provided interiorly with bearing and guiding bosses 134. The guide rods 94 pass through the base of the inverted cup-like member 130 and through the guide bosses 134 thereof, serving to guide the member 130 and the jack body for vertical movement toward and from the base unit 28. It will be noted that the guide frame 90, 95, 96 is anchored to the base member through the tie rod 50, so that the jack piston cannot move upward. As the cylinder is filled with hydraulic fluid, therefore, the jack body must move downward. The member 130 has affixed to it four vertically disposed, radially extending, thrust plates 136 which terminate at their lower boundaries in a common, horizontal plane. The plates 136 are adapted to bear downward against the upper face of the upper disc 68, and to thrust it downward. The member 130 and the plates 136 jointly form a presser head for transmitting the downward pressure of the jack body 102 to the upper disc 68, and through the upper disc 68 to the tire 10, the lower disc 64 and the base unit 28.

As hydraulic fluid is forced into the cylinder 106 by operation of the piston 112, the upper disc is forced downward, and since the lower disc cannot yield the upper disc is caused to approach the lower one. This will inevitably result in a short time in the breaking of either the upper or the lower bead of the tire from its firm union with the associated section of the wheel.

If we assume the case in which the upper bead is broken first, the lower bead will continue to be supported at the original level by the flange 66 of the lower disc 64, but the upper bead will be displaced downward a substantial distance below the upper flange 26.

At this point the pumping is interrupted long enough for the operator to insert the heads of three tools 138 through the respective noches 82 of the upper disc flange. Each tool consists of a single piece of metal. Each tool comprises a broad flat handle 140 and a round head 142. The diameter of the head is a little greater than the depth of the notch 82 and the length of the head is a little less than the width of the notch, but somewhat greater than the width of the handle 140. The head is forced through the notch between the notch base and the tire bead to hold the rim flange and the bead apart. The tools serve to prevent the springing back of the upper bead into proximity to the upper rim flange 26, and thus to retain the bead in surrounding relation to a portion of the rim which is of less diameter than the portion immediately adjacent the rim flange. The bead is thus prevented from becoming frictionally bound on the rim after its firm connection to the rim has been broken.

As the pumping is resumed, and the upper disc is forced further downward, the body of the upper disc 68 engages the rim flange 26 of the wheel itself, and begins to force the entire wheel positively downward. Since the lower bead is still held up positively by the lower disc flange 66 the lower bead is quickly broken free. When this happens the wheel is free to move downward and it does so until the upper flange 26 rests upon beads of the three tools 138, previously inserted. The lower wheel section drops down at the same time, to rest upon the body part of the lower disc 64.

The needle valve 128 is then opened to relieve the hydraulic pressure gradually. The tire, through its elasticity, forces the upper bead away from the lower one, and this carries the upper wheel section and the upper disc upward in unison with the upper bead. When this process has been carried so far that the tension on the tie rod 50 is completely relieved, the upper unit 52 is turned to break the connection between the tie rod 50 and the block 90, and the upper unit is detached and put to one side. The upper disc 70, the upper section 14 of the wheel, the tire itself, the lower wheel section 16, and, if desired, the lower disc 64 are then successively individually removed from the machine.

The entire operation is effected expeditiously and without damage to the tire. It is accomplished entirely by manual operation, yet without any very great exertion on the part of the operator.

It was assumed above that the upper bead broke before the lower bead. In the opposite case the lower wheel section drops down onto the body of disc 64 and has no tendency to rise again, but the tire continues to be supported from the flange of the lower disc through its lower bead. As the pumping is continued and the upper bead continues to be forced down, the upper wheel section 12 is forced down with it until it is arrested by re-engagement with the fixedly supported wheel section 12. As the upper disc continues to depress the upper bead, the upper bead is broken loose from the upper wheel section 14. The tools 138 are then inserted through the notches 82 of the upper disc 68, the hydraulic pressure is relieved, and the operation is completed as previously described.

It should be noted that the base unit 28 and the pressure unit are of roughly equal height, each being of a height substantially less than half the height of the assembled machine as shown in Figure 1. Each unit is of substantially less linear extent than the diameter of the smallest tire upon which it is designed to work. These two principal units are, therefore, of small bulk and small mass. They divide the principal weight of the machine substantially equally between them, each being light enough to be lifted by a workman of moderate strength. All this facilitates transportation of the machine by truck, trailer or other vehicular means.

I have described what I believe to be the best embodiments of my invention. I do not wish, however, to be confined to the embodiments shown, but what I desire to cover by Letters Patent is set forth in the appended claims.

I claim:

1. The method of completely freeing a tire from a split wheel at a single operation which comprises applying simultaneous opposed axial breaking thrusts to the beads, each concentrated at a series of equi-angularly spaced localized points until one of the beads starts to break, progressively extending the points of axial thrust circumferentially along that bead in both directions from each of said localized points until that bead is completely broken, then by continued pressure applying thrust directly to the wheel section freed by the broken bead to hold the wheel against the balanced thrust applied to the other, unbroken bead until the latter bead has been broken progressively in the same manner as the first.

2. A direct thrust machine designed for breaking at a single operation of the tire beads from both sections of a split wheel, comprising, in combination, a portable base unit and a removable upper unit in concentric and opposed relation to said base unit, each unit including a series of axially directed rigid segments equally spaced about the periphery of said wheel, each segment having a radially inwardly directed shoulder integral therewith at the inner side of the base thereof, and each segment being of sufficient height to break the bead engaged by it before the shoulder engages the associated wheel rim but of less height than half the axial distance between the two wheel rims, whereby when one bead has been broken said shoulder will engage the adjacent rim and oppose the thrust against the other bead, and fluid pressure means operable to force the units together, and each segment being of varied height to provide a least one high part bordered by parts of progressively less height so that the maximum pressure will be first concentrated at the high parts and will extend progressively as the bead breaking progresses.

References Cited in the file of this patent

UNITED STATES PATENTS

| | | |
|---|---|---|
| 1,358,336 | Rylander | Nov. 9, 1920 |
| 2,406,996 | Colley | Sept. 3, 1946 |
| 2,418,849 | Polt | Apr. 15, 1947 |
| 2,436,003 | Gosselin | Feb. 17, 1948 |
| 2,442,714 | Stack | June 1, 1948 |
| 2,512,864 | Koester | June 27, 1950 |
| 2,518,126 | Daw et al. | Aug. 8, 1950 |
| 2,537,041 | Finch | Jan. 9, 1951 |
| 2,595,258 | Hildred | May 6, 1952 |